(12) United States Patent
Hendrix

(10) Patent No.: US 7,204,270 B2
(45) Date of Patent: Apr. 17, 2007

(54) AUTOMATED WATER SHUT-OFF VALVE

(76) Inventor: James J. Hendrix, 7750 N. McArthur #120-254, Irving, TX (US) 75063

( * ) Notice: Subject to any disclaimer, the term of this patent is extended or adjusted under 35 U.S.C. 154(b) by 171 days.

(21) Appl. No.: 11/099,894

(22) Filed: Apr. 7, 2005

(65) Prior Publication Data

US 2006/0225796 A1 Oct. 12, 2006

(51) Int. Cl.
*F16K 7/06* (2006.01)
(52) U.S. Cl. .............. 137/624.12; 137/486; 137/487.5; 137/551
(58) Field of Classification Search ........... 137/624.12, 137/551, 486, 487.5
See application file for complete search history.

(56) References Cited

U.S. PATENT DOCUMENTS

| | | | |
|---|---|---|---|
| 4,057,173 A | 11/1977 | Tal | |
| 4,518,955 A | 5/1985 | Meyer | |
| 4,807,661 A * | 2/1989 | Lewis et al. ............ | 137/624.12 |
| 5,086,806 A | 2/1992 | Engler et al. | |
| D393,049 S | 3/1998 | Allen, Jr. | |
| 5,920,265 A | 7/1999 | Johnson, Jr. et al. | |
| 5,971,011 A | 10/1999 | Price | |
| 6,105,607 A * | 8/2000 | Caise et al. ............ | 137/624.12 |

OTHER PUBLICATIONS

Product Name: Flow Manager & Floodstop Systems; 15 pages.

* cited by examiner

*Primary Examiner*—Kevin Lee

(57) ABSTRACT

A device includes a housing that has a plurality of monolithically formed walls, wherein selected walls are provided with inlet and outlet ports respectively. The housing includes a coupling in fluid communication with the inlet and outlet ports, a mechanism for detecting a fluctuation in water pressure, and a mechanism for selectively prohibiting water flow. The prohibiting mechanism cooperates with the detecting mechanism. The housing also includes a mechanism for providing an audible notification when the water supply is toggled between interrupted and reinstated modes and a mechanism for manually controlling the prohibiting mechanism. The manually controlling mechanism is electrically coupled to the prohibiting mechanism. An internal power supply source supplies power to the detecting mechanism, the prohibiting mechanism, and the manually controlling mechanism. A diode is attached to the housing and is illuminable when the power supply source reaches a minimum threshold level.

15 Claims, 3 Drawing Sheets

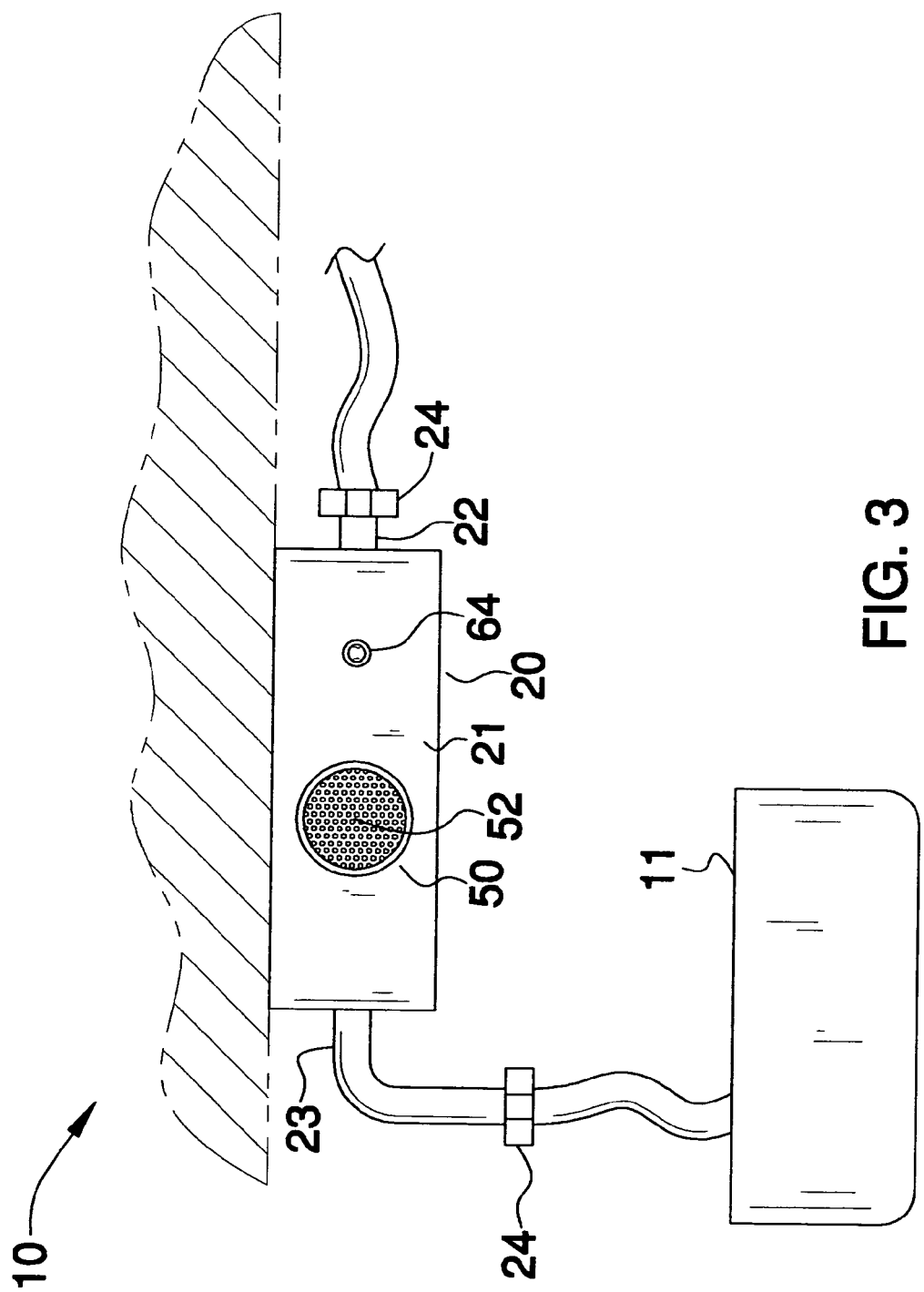

AUTOMATED WATER SHUT-OFF VALVE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to automated valves and, more particularly, to an automated water shut-off valve for interrupting undesirable water discharge.

2. Prior Art

Water shut-off valves and systems are known. Some of them are based on monitoring a continuous flow of water. The problem with such a system is that eventually an acceptable continuous flow, such as from a leaking valve in a toilet tank, will accumulate until a fault condition is indicated that shuts off the flow of water when, in fact, a serious fault condition does not exist.

Also, certain other types of continuous flow systems are more complex and require that a second flow sensor be installed in a drain line and then connected to the system so as to determine when a protracted or excessive flow of water is nevertheless acceptable, because it is not then believed to be accumulating in the house. This is hardly foolproof as considerable damage may be occurring, yet the water may eventually find its way to a drain. Also such a system is more complex to install and to maintain.

Still other known systems do not allow for varying conditions, such as occur during seasonal changes when, for example, a lawn is to be watered in the summer and then only on particular days, or for special situations such as when the family is away from the home on vacation. For example, some of these prior systems specifically require that physical installation of the system occur after water has already been acquired for sprinkler use, thereby rendering the system ineffective in detecting leaks involving the sprinkler system.

Other systems are not well suited for use in commercial installations where potentially high flow rates are likely to occur, and when, during normal use, a continuous flow may be present simply due to many users having intermittent requirements that occasionally result in a protracted and uninterrupted continuous flow that can be misinterpreted as a fault condition (leak) that results in stopping the flow of water when it is not desired.

Accordingly, a need remains for an automated water shut-off valve in order to overcome the above-noted shortcomings. The present invention satisfies such a need by providing an automated shut-off valve that is adaptable in function and provides protection from water damage. Such an automated water shut-off valve actively cuts off water flow in the presence of a leak developing in a fixture or exposed supply line, thereby minimizing costly water damage to a structure and the furnishings contained therein. The system can be adapted for use in most residential structures and requires no maintenance beyond periodic battery replacement.

BRIEF SUMMARY OF THE INVENTION

In view of the foregoing background, it is therefore an object of the present invention to provide an automated water shut-off valve. These and other objects, features, and advantages of the invention are provided by a water leak detection and control device for interrupting undesirable water discharge.

The device includes a housing that has a cubic shape and a plurality of monolithically formed walls sized and shaped for fitting adjacent to a water-activated appliance. Selected ones of the walls are provided with inlet and outlet ports respectively wherein the inlet port effectively introduces water into the housing and the outlet port directs water away from the housing.

Such a housing includes a coupling in fluid communication with the inlet and outlet ports, a mechanism for detecting a fluctuation in water pressure as water is passed through the housing, and a mechanism for selectively prohibiting water from exiting the outlet port. The prohibiting mechanism may include an electrically operable valve housed within the coupling and located downstream of the sensor. Such a prohibiting mechanism cooperates with the detecting mechanism such that a supply of water can advantageously be automatically interrupted and reinstated when a predetermined event occurs respectively. Such a predetermined event can be manually reset as desired by the user.

The detecting mechanism preferably includes a sensor positioned on a top surface of the coupling and partially extending downwardly therethrough in such a manner that the sensor effectively intersects a flow path of the water medially between the inlet and outlet ports. A processor is electrically mated to the sensor and a memory is electrically mated to the processor. Such memory bears software instructions for enabling the device to perform predetermined operations. The operations include the steps of determining a time interval in which a volume of water has been transferred between the inlet port and outlet port and generating and transmitting a control signal to the processor for instructing the processor to toggle the prohibiting mechanism to a closed position when the time interval extends beyond a predetermined threshold.

The housing also includes a mechanism for providing an audible notification to a user when the water supply is toggled between interrupted and reinstated modes and a mechanism for manually controlling the prohibiting mechanism. Such a manually controlling mechanism is electrically coupled to the prohibiting mechanism for allowing the user to manually control a volume of water passing through the housing.

The audible notification mechanism preferably includes a control circuit electrically mated to the processor and a speaker electrically mated to the control circuit. Such a speaker transmits an audible message when the electric valve is toggled between open and closed positions. The manually controlling mechanism preferably further includes a timer and a timer control electrically coupled thereto, a display screen connected to one of the walls of the housing, and a reset button electrically coupled to the processor such that the user can manually reset the timer by viewing the display screen in such a manner that a volume of water is allowed to flow through the coupling during emergency situations.

An internal power source supplies power to the detecting mechanism, the prohibiting mechanism, and the manually controlling mechanism. A diode is operably attached to the housing and is conveniently illuminable when the internal power supply source reaches a minimum threshold level.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a top plan view of the device shown in FIG. 1.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
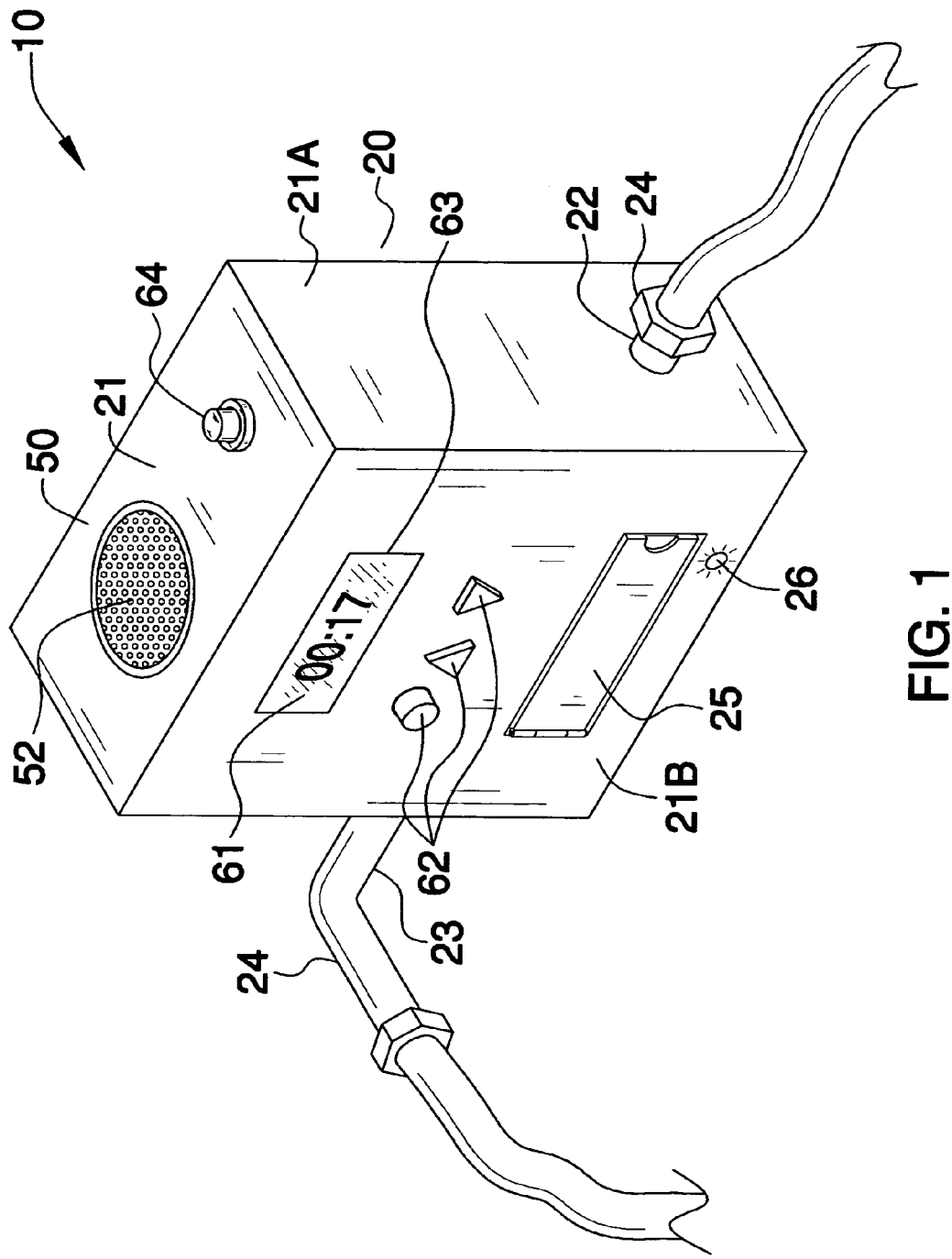
FIG. 1 is a perspective view showing an automated water shut-off valve, in accordance with the present invention.
Figure 2:
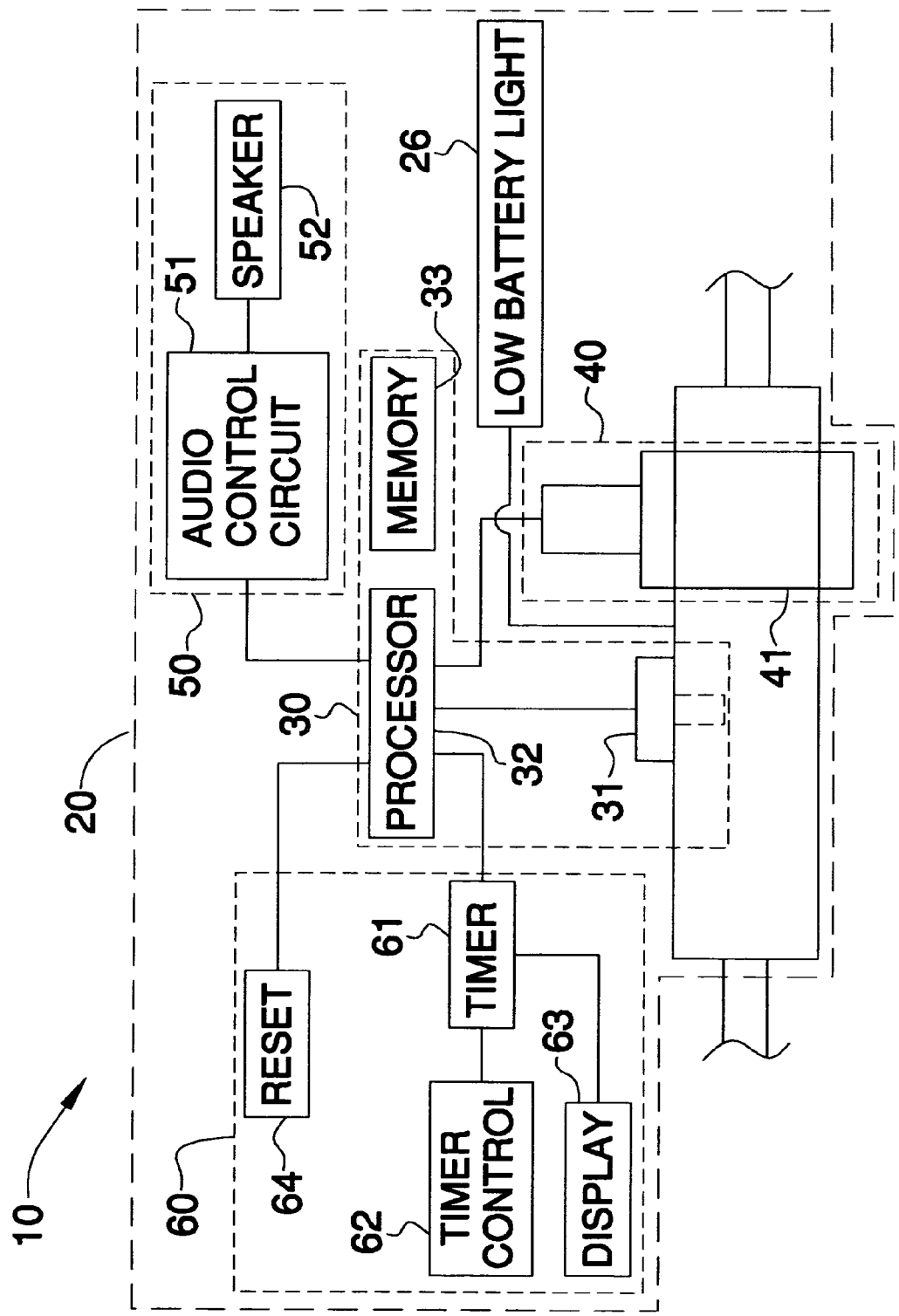
FIG. 2 is a schematic block diagram of the device shown in FIG. 1.

The device of this invention is referred to generally in FIGS. 1–3 by the reference numeral 10 and is intended to provide an automated water shut-off valve. It should be understood that the apparatus 10 may be used to shut off water flow for many different types of applications and should not be limited in use to only detecting and interrupting leaks in irrigations systems.

Referring initially to FIG. 1, the device 10 includes a housing 20 that has a cubic shape and a plurality of monolithically formed walls 21 sized and shaped for fitting adjacent to a water-activated appliance 11, including but not limited to an icemaker, toilet and sprinkler system. Of course, such a housing 20 may be alternately sized and shaped, as is obvious to a person of ordinary skill in the art. Selected ones 21A of the walls 21 are provided with inlet 22 and outlet 23 ports respectively wherein the inlet port 22 effectively introduces water into the housing 20 and the outlet port 23 directs water away from the housing 20. This feature is convenient and critical for not interrupting the overall flow of water.

Referring to FIGS. 1 and 3, such a housing 20 further includes a coupling 24 in fluid communication with the inlet 22 and outlet 23 ports, a mechanism 30 for detecting a fluctuation in water pressure as water is passed through the housing 20, and a mechanism 40 for selectively prohibiting water from exiting the outlet port 23. Of course, a variety of different couplings 24 suitable to the specific appliance 11 may be attached to the inlet 22 and outlet 23 ports, as is obvious to a person of ordinary skill in the art.

The prohibiting mechanism 40 includes an important electrically operable valve 41 housed within the coupling 24 and located downstream of the sensor 31 (described herein below). Such a prohibiting mechanism 40 cooperates with the detecting mechanism 30 such that a supply of water can advantageously be automatically interrupted and reinstated when a predetermined event occurs respectively, which is essential and advantageous for preventing damage to the appliance 11 and its surroundings due to overexposure to water. The predetermined event can advantageously be manually reset as desired by the user, thus increasing the versatility of the device 10.

Referring to FIG. 2, the detecting mechanism 30 includes a sensor 31 positioned on a top surface of the coupling 24 and partially extending downwardly therethrough in such a manner that the sensor 31 effectively intersects a flow path of the water medially between the inlet 22 and outlet 23 ports, which is critical for accurately detecting the flow path. A processor 32 is electrically mated to the sensor 31 and a memory 33 is electrically mated to the processor 32. Such memory 33 bears software instructions for enabling the device 10 to perform predetermined operations, advantageously allowing the device 10 to operate automatically. The operations include the steps of determining a time interval in which a volume of water has been transferred between the inlet port 22 and outlet port 23, and generating and transmitting a control signal to the processor 32 for instructing the processor 32 to toggle the prohibiting mechanism 40 to a closed position when the time interval extends beyond a predetermined threshold.

Still referring to FIG. 2, the housing 20 also includes a mechanism 50 for providing an audible notification to a user when the water supply is toggled between interrupted and reinstated modes and a mechanism 60 for manually controlling the prohibiting mechanism 40. Such a manually controlling mechanism 60 is electrically coupled to the prohibiting mechanism 40 for allowing the user to manually control a volume of water passing through the housing 20. The audible notification mechanism 50 conveniently alerts a user that an inappropriate amount of water flow is occurring, thus allowing the user to correct the problem before significant damage occurs.

Referring to FIGS. 1 through 3, the audible notification mechanism 50 includes a control circuit 51 electrically mated to the processor 32 and a speaker 52 electrically mated to the control circuit 51. Such a speaker 52 transmits an audible message when the electric valve 41 is toggled between open and closed positions. The manually controlling mechanism 60 further includes a timer 61 and a timer control 62 electrically coupled thereto, a display screen 63 connected to one 21B of the walls 21 of the housing 20, and a reset button 64 electrically coupled to the processor 32 such that the user can manually reset the timer 61 by viewing the display screen 63 in such a manner that a volume of water is allowed to flow through the coupling 24 during emergency situations.

Referring to FIGS. 1 and 2, an internal power supply source 25 advantageously supplies power to the detecting mechanism 30, the prohibiting mechanism 40, and the manually controlling mechanism 60. A diode 26 is operably attached to the housing 20 and is conveniently illuminable when the internal power supply source 25 reaches a minimum threshold level for conveniently notifying a user that same needs to be replaced.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A water leak detection and control device for interrupting undesirable water discharge, said device comprising:
    a housing having a plurality of monolithically formed walls sized and shaped for fitting adjacent a water-activated appliance, selected ones of said walls being provided with inlet and outlet ports respectively wherein said inlet port introduces water into said housing and said outlet port directs water away from said housing, said housing comprising
        a coupling in fluid communication with said inlet and outlet ports,
        means for detecting a fluctuation in water pressure as water is passed through said housing,
        means for selectively prohibiting water from exiting said outlet port, said prohibiting means cooperating with said detecting means such that a supply of water can be automatically interrupted and reinstated when a predetermined event occurs respectively,
        means for providing an audible notification to a user when the water supply is toggled between interrupted and reinstated modes, and
        means for manually controlling said prohibiting means, said manually controlling means being electrically coupled to said prohibiting means for allowing the user to manually control a volume of water passing through said housing, wherein the predetermined event can be manually reset as desired by the user.

2. The device of claim 1, wherein said detecting means comprises:
    a sensor positioned on a top surface of said coupling and partially extending downwardly therethrough in such a manner that said sensor intersects a flow path of the water medially between said inlet and outlet ports;
    a processor electrically mated to said sensor; and
    a memory electrically mated to said processor, said memory bearing software instructions for enabling said device to perform predetermined operations including the steps of:
        determining a time interval in which a volume of water has been transferred between said inlet port and outlet port, and
        generating and transmitting a control signal to said processor for instructing said processor to toggle said prohibiting means to a closed position when the time interval extends beyond a predetermined threshold.

3. The device of claim 2, said prohibiting means comprising: an electrically operable valve housed within said coupling and located downstream of said sensor.

4. The device of claim 2, wherein said audible notification means comprises:
    a control circuit electrically mated to said processor; and
    a speaker electrically mated to said control circuit wherein said speaker transmits an audible message when said electric valve is toggled between open and closed positions.

5. The device of claim 2, wherein said manually controlling means comprises:
    a timer and a timer control electrically coupled thereto;
    a display screen connected to one said walls of said housing; and
    a reset button electrically coupled to said processor such that the user can manually reset said timer by viewing said display screen in such a manner that a volume of water is allowed to flow through said coupling during emergency situations.

6. A water leak detection and control device for interrupting undesirable water discharge, said device comprising:
    a housing having a plurality of monolithically formed walls sized and shaped for fitting adjacent a water-activated appliance, selected ones of said walls being provided with inlet and outlet ports respectively wherein said inlet port introduces water into said housing and said outlet port directs water away from said housing, said housing comprising
        a coupling in fluid communication with said inlet and outlet ports,
        means for detecting a fluctuation in water pressure as water is passed through said housing,
        means for selectively prohibiting water from exiting said outlet port, said prohibiting means cooperating with said detecting means such that a supply of water can be automatically interrupted and reinstated when a predetermined event occurs respectively,
        means for providing an audible notification to a user when the water supply is toggled between interrupted and reinstated modes,
        means for manually controlling said prohibiting means, said manually controlling means being electrically coupled to said prohibiting means for allowing the user to manually control a volume of water passing through said housing, wherein the predetermined event can be manually reset as desired by the user,
        an internal power source supplying power to said detecting means and said prohibiting means and said manually controlling means, and
        a diode operably attached to said housing and being illuminable when said internal power supply source reaches a minimum threshold level.

7. The device of claim 6, wherein said detecting means comprises:
    a sensor positioned on a top surface of said coupling and partially extending downwardly therethrough in such a manner that said sensor intersects a flow path of the water medially between said inlet and outlet ports;
    a processor electrically mated to said sensor; and
    a memory electrically mated to said processor, said memory bearing software instructions for enabling said device to perform predetermined operations including the steps of:
        determining a time interval in which a volume of water has been transferred between said inlet port and outlet port, and generating and transmitting a control signal to said processor for instructing said processor to toggle said prohibiting means to a closed position when the time interval extends beyond a predetermined threshold.

8. The device of claim 7, said prohibiting means comprising: an electrically operable valve housed within said coupling and located downstream of said sensor.

9. The device of claim 7, wherein said audible notification means comprises:
   a control circuit electrically mated to said processor; and
   a speaker electrically mated to said control circuit wherein said speaker transmits an audible message when said electric valve is toggled between open and closed positions.

10. The device of claim 7, wherein said manually controlling means comprises:
    a timer and a timer control electrically coupled thereto;
    a display screen connected to one said walls of said housing; and
    a reset button electrically coupled to said processor such that the user can manually reset said timer by viewing said display screen in such a manner that a volume of water is allowed to flow through said coupling during emergency situations.

11. A water leak detection and control device for interrupting undesirable water discharge, said device comprising:
    a housing having cubic shape and a plurality of monolithically formed walls sized and shaped for fitting adjacent a water-activated appliance, selected ones of said walls being provided with inlet and outlet ports respectively wherein said inlet port introduces water into said housing and said outlet port directs water away from said housing, said housing comprising
    a coupling in fluid communication with said inlet and outlet ports,
    means for detecting a fluctuation in water pressure as water is passed through said housing,
    means for selectively prohibiting water from exiting said outlet port, said prohibiting means cooperating with said detecting means such that a supply of water can be automatically interrupted and reinstated when a predetermined event occurs respectively,
    means for providing an audible notification to a user when the water supply is toggled between interrupted and reinstated modes,
    means for manually controlling said prohibiting means, said manually controlling means being electrically coupled to said prohibiting means for allowing the user to manually control a volume of water passing through said housing, wherein the predetermined event can be manually reset as desired by the user,
    an internal power source supplying power to said detecting means and said prohibiting means and said manually controlling means, and
    a diode operably attached to said housing and being illuminable when said internal power supply source reaches a minimum threshold level.

12. The device of claim 11, wherein said detecting means comprises:
    a sensor positioned on a top surface of said coupling and partially extending downwardly therethrough in such a manner that said sensor intersects a flow path of the water medially between said inlet and outlet ports;
    a processor electrically mated to said sensor; and
    a memory electrically mated to said processor, said memory bearing software instructions for enabling said device to perform predetermined operations including the steps of:
      determining a time interval in which a volume of water has been transferred between said inlet port and outlet port, and
      generating and transmitting a control signal to said processor for instructing said processor to toggle said prohibiting means to a closed position when the time interval extends beyond a predetermined threshold.

13. The device of claim 12, said prohibiting means comprising: an electrically operable valve housed within said coupling and located downstream of said sensor.

14. The device of claim 12, wherein said audible notification means comprises:
    a control circuit electrically mated to said processor; and
    a speaker electrically mated to said control circuit wherein said speaker transmits an audible message when said electric valve is toggled between open and closed positions.

15. The device of claim 12, wherein said manually controlling means comprises:
    a timer and a timer control electrically coupled thereto;
    a display screen connected to one said walls of said housing; and
    a reset button electrically coupled to said processor such that the user can manually reset said timer by viewing said display screen in such a manner that a volume of water is allowed to flow through said coupling during emergency situations.

* * * * *